US008851256B2

(12) United States Patent  (10) Patent No.: US 8,851,256 B2
Blanchard  (45) Date of Patent: Oct. 7, 2014

(54) TRANSMISSION BETWEEN AN ENGINE INPUT SHAFT AND AN OUTPUT SHAFT OF A MOTOR VEHICLE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 163 days.

(21) Appl. No.: 13/391,748

(22) PCT Filed: Sep. 3, 2010

(86) PCT No.: PCT/FR2010/051835
§ 371 (c)(1),
(2), (4) Date: Feb. 22, 2012

(87) PCT Pub. No.: WO2011/039440
PCT Pub. Date: Apr. 7, 2011

(65) Prior Publication Data
US 2012/0145501 A1  Jun. 14, 2012

(30) Foreign Application Priority Data
Sep. 30, 2009  (FR) ...................................... 09 04658

(51) Int. Cl.
*F16D 21/00*  (2006.01)
*F16D 11/10*  (2006.01)
*B60W 10/02*  (2006.01)
*F16D 11/14*  (2006.01)
*A01D 34/68*  (2006.01)
*F16D 23/04*  (2006.01)
*F16H 63/30*  (2006.01)

(52) U.S. Cl.
CPC ............ *A01D 34/6812* (2013.01); *F16D 11/14* (2013.01); *F16H 2063/3093* (2013.01); *F16H 63/30* (2013.01); *F16D 23/04* (2013.01)
USPC ...... 192/48.5; 192/48.7; 192/53.5; 192/70.21

(58) Field of Classification Search
None
See application file for complete search history.

(56) References Cited

U.S. PATENT DOCUMENTS 3,680,409 A * 8/1972 Chamberlain ................. 475/300
4,584,892 A * 4/1986 Hiraiwa et al. ................. 74/339
5,339,936 A * 8/1994 Lauer et al. .............. 192/53.332

(Continued)

FOREIGN PATENT DOCUMENTS

FR  2 867 534 A1  9/2005
GB  2 030 660 A   4/1980

OTHER PUBLICATIONS

International Search Report, dated Nov. 29, 2010, corresponding PCT application.

*Primary Examiner* — Gene Crawford
*Assistant Examiner* — Mark Manley
(74) *Attorney, Agent, or Firm* — Young & Thompson

(57) ABSTRACT

A transmission between a driving primary shaft and an outlet shaft of a self-propelled machine, includes a housing within which there are housed, at least in part: a stepdown mechanism; two clutch mechanisms, one being progressive and the other being non-progressive with a movable dog; and a clutch control device including first and second clutch control elements. The second clutch control elements include at least one spring blade extending along the outlet shaft, the spring blade being mounted to move axially on the outlet shaft during axial movement of the dog from the unclutched extreme position towards a clutched position as a result of the movable dog bearing thereagainst, the spring blade being drivable axially on the shaft and being elastically deformable between an active position in which the dog comes into abutment against the spring blade, and an inactive position in which the dog slides along the spring blade.

6 Claims, 2 Drawing Sheets

(56) References Cited

U.S. PATENT DOCUMENTS 5,531,305 A * 7/1996 Roberts et al. ........... 192/53.332
5,641,044 A * 6/1997 Morscheck ............. 192/53.331
6,475,109 B2 * 11/2002 Blanchard .................... 474/101
7,004,298 B2 * 2/2006 Blanchard .................... 192/66.2
7,669,702 B2 * 3/2010 Blanchard ....................... 192/50
2002/0139210 A1 10/2002 Blanchard

* cited by examiner

TRANSMISSION BETWEEN AN ENGINE INPUT SHAFT AND AN OUTPUT SHAFT OF A MOTOR VEHICLE

BACKGROUND OF THE INVENTION

The present invention relates to a transmission between a driving primary shaft and an outlet shaft, such as the wheel drive shaft of a self-propelled machine.

The invention relates more particularly to a transmission of the type comprising at least one housing within which there are housed at least in part: a stepdown mechanism comprising a driving member, such as a wormscrew, meshing with a driven rotary member, such as a gearwheel that is mounted free to rotate on the outlet shaft; two clutch mechanisms, one of the mechanisms being progressive and the other mechanism being non-progressive with a movable dog, whereby the driven rotary member is suitable for being coupled/decoupled with or from the outlet shaft; and a clutch control device comprising both first clutch control means for driving the movable dog of the non-progressive clutch mechanism in axial movement along the outlet shaft between two extreme positions, said first clutch control means being capable of being actuated from outside the housing, and also second clutch control means mounted on the outlet shaft to move under the action of the movable dog moving axially in the clutching direction, by bearing contact against said movable dog, between firstly an active position in which said second clutch control means are interposed between the movable dog and the progressive clutch mechanism and form a member for transmitting axial movement from the movable dog to the progressive clutch mechanism in order to pass the progressive clutch mechanism from a declutched position to a clutched position, and secondly an inactive or retracted position in which the movable dog is suitable for passing from an unclutched position to the clutched position of the non-progressive clutch mechanism.

Such transmissions are well known to those skilled in this art, as illustrated by patent GB-2 030 660. Such transmissions are inexpensive compared with a transmission having progressive clutch mechanisms exclusively, while nevertheless conserving the absence of jolting and conserving the progressive nature of a progressive clutch.

Nevertheless, until now, the second clutch control means have been made in a manner that is complex and lacking in reliability.

SUMMARY OF THE INVENTION

An object of the present invention is thus to propose a transmission of design that is improved in order to increase the reliability of the control device.

To this end, the invention provides a transmission between a primary drive shaft and an outlet shaft, such as the wheel drive shaft of a self-propelled machine, the transmission being of the type comprising at least one housing within which there are housed at least in part: a stepdown mechanism comprising a driving member, such as a wormscrew; meshing with a driven rotary member, such as a gearwheel that is mounted free to rotate on the outlet shaft; two clutch mechanisms, one of the mechanisms being progressive and the other mechanism being non-progressive with a movable dog, whereby the driven rotary member is suitable for being coupled/decoupled with or from the outlet shaft; and a clutch control device comprising both first clutch control means for driving the movable dog of the non-progressive clutch mechanism in axial movement along the outlet shaft between two extreme positions, said first clutch control means being capable of being actuated from outside the housing, and also second clutch control means mounted on the outlet shaft to move under the action of the movable dog moving axially in the clutching direction, by bearing contact against said movable dog, between firstly an active position in which said second clutch control means are interposed between the movable dog and the progressive clutch mechanism and form a member for transmitting axial movement from the movable dog to the progressive clutch mechanism in order to pass the progressive clutch mechanism from a declutched position to a clutched position, and secondly an inactive or retracted position in which the movable dog is suitable for passing from an unclutched position to the clutched position of the non-progressive clutch mechanism; the transmission being characterized in that the second clutch control means comprise at least one spring blade extending along the outlet shaft, said spring blade being mounted to move axially on said outlet shaft and having said movable dog bearing thereagainst during the axial movement of the movable dog from the unclutched extreme position towards a clutched position thereby driving said spring blade axially on said shaft and deforming it elastically between an active position in which the movable dog comes into abutment against said spring blade to transmit its axial movement to the progressive clutch mechanism via the spring blade interposed between the movable dog and the progressive clutch mechanism, and an inactive position in which the movable dog slides along the spring blade to pass the non-progressive clutch mechanism from an unclutched position to a clutched position.

Thus, during the clutching stage, the blade is deformable as a function of the bearing force exerted on said blade by the movable dog, and it is suitable for passing from an active position in which it is constrained to move axially with the movable dog and transmit the axial movement of the movable dog to the progressive clutch mechanism so as to pass from an unclutched position to a clutched position of the progressive clutch mechanism, to an inactive position in which the movable dog is separated in axial movement from the blade and is mounted so as to be free to move axially on said outlet shaft relative to the blade so as to enable it to pass from the disengaged or declutched position to the engaged or clutched position of the non-progressive clutch mechanism. Making the second clutch control means essentially in the form of a deformable blade simplifies the construction of the transmission as a whole. Furthermore, the operation of such a transmission is entirely reliable. Its progressive nature is conserved because the progressive clutch mechanism is taken into the clutch position before the non-progressive clutched mechanism passes to the clutched position.

In a preferred embodiment of the invention, the second clutch control means comprise at least two spring blades extending along the outlet shaft and preferably mounted diametrically opposite each other about said outlet shaft, said spring blades being coupled together at or close to one of their ends so as to be constrained to move together axially along said outlet shaft by means of a ring engaged on said outlet shaft.

Preferably, the non-progressive clutch mechanism with a movable dog housed inside the housing comprises a hollow plate in addition to the sleeve type movable dog, which movable dog and plate carry teeth on their facing faces, the hollow plate being constrained to rotate with the driven rotary member of the stepdown mechanism, while the movable dog that is constrained to rotate with the outlet shaft passing through said housing is mounted to move axially under the action of first clutch control means, in particular in the direction for causing it to approach said plate so that, in the clutched position, the teeth of the plate and the teeth of the movable dog are received between one another so as to respond to rotary drive from the driven rotary member of the stepdown mechanism by imparting rotary drive to the axially movable dog and consequently rotary drive to the outlet shaft passing axially through the plate and the movable dog, the second clutch control means in the active position being interposed between the movable dog and the plate.

In a preferred embodiment, the movable dog of the non-progressive clutch mechanism is in the form of a sleeve that is constrained to rotate with the outlet shaft and that is axially movable in sliding along said outlet shaft, said sleeve being provided with an inner peripheral shoulder against which the spring blade(s) of the second clutch control means come to bear in the active position, said inner peripheral shoulder being made either integrally with said movable dog or else by means of a part additional to the movable dog and mounted securely thereto, both axially and in rotation.

When the transmission is of the type in which the movable dog of the non-progressive clutch mechanism is a sleeve that is mounted to rotate with the outlet shaft and to be movable in sliding along said outlet shaft, preferably, the or each blade of the second clutch control means in the active position is arranged to bear via a "free" one of its ends against an inner peripheral shoulder of said movable dog, said free end of the or each blade being curved towards the outlet shaft so as to form a ramp 13 that, by co-operating with the inner peripheral shoulder of the movable dog, makes it easier to retract the corresponding blade in order to pass to the inactive position.

Preferably, the or each inner peripheral shoulder portion of the movable dog against which the or a spring blade comes into abutment via its free end extends inside an inner axial groove of said sleeve, the blade(s) when in the inserted state in the grooves being constrained to rotate with the sleeve.

Generally, the movable dog of the non-progressive clutch mechanism is mounted to rotate with the outlet shaft via at least one U-shaped strap, one of the branches of the U-shape forming an axial abutment for the second clutch control means during axial movement of the movable dog in the unclutching direction.

In a preferred embodiment, the driven rotary member of the stepdown mechanism is a gearwheel mounted free to rotate on the outlet shaft, the clutch mechanisms being mounted on the outlet shaft, one on one side and the other on the other side of the gearwheel.

Preferably, the progressive clutch mechanism is a friction clutch with cones, said clutch comprising a male cone constrained to rotate with the outlet shaft and a "female" conical bearing surface constrained to rotate with the rotary driven member of the stepdown mechanism, the cone and the conical bearing surface being arranged about the axis of the outlet shaft and being mounted via at least the second clutch control means to move towards each other or apart from each other in order to clamp or unclamp the male cone and the conical bearing surface.

Also preferably, the first clutch control means comprise a member such as a fork, that is angularly movable about an axis substantially perpendicular to the axis of the outlet shaft, said member including at least one portion, such as a tooth, that is inserted in an outer annular groove of the movable dog of the non-progressive clutch mechanism.

BRIEF DESPRIPTION OF THE DRAWINGS

The invention can be well understood on reading the following description of embodiments, with reference to the accompanying drawings, in which.

DETAILED DESCRIPTION OF THE PREFERRED EMBODIMENTS

Figure 1:
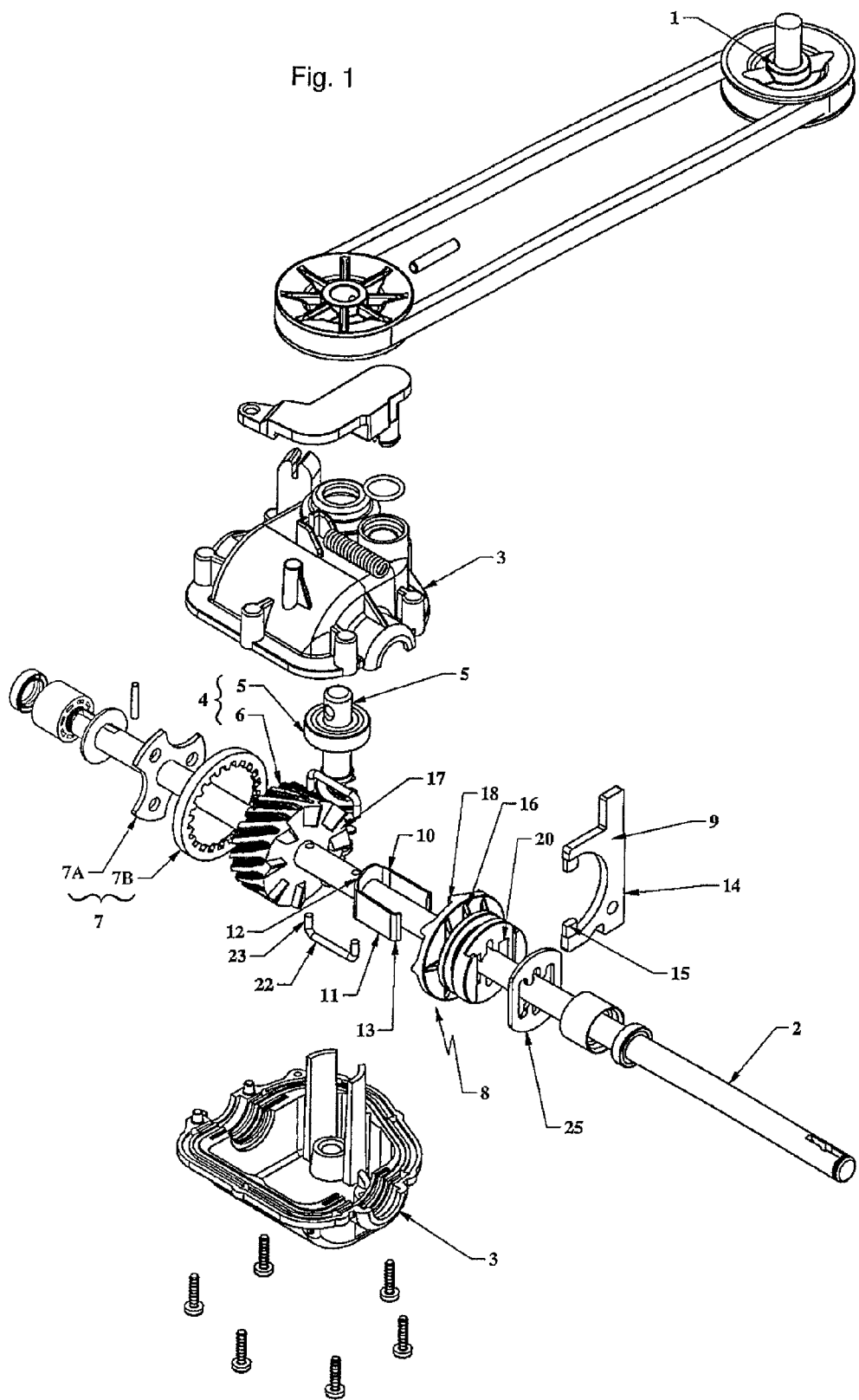
FIG. 1 is a perspective view of a transmission with its component elements shown in an exploded position.
Figure 2:
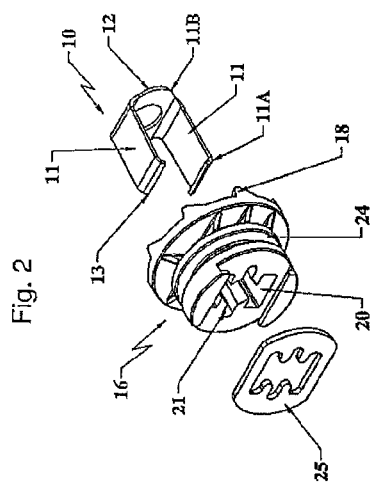
FIG. 2 is a perspective view of the moving dog and of the second clutch control means.

As mentioned above, the transmission of the invention is for transmitting rotary motion from a primary drive shaft 1 of a self-propelled machine, such as a lawnmower, to an outlet shaft 2, such as the shaft for driving the wheels of said machine, and it comprises at least one housing 3 generally made of synthetic material, e.g. comprising two half-shells that are assembled together via a join plane. The housing 3 houses, at least in part: a stepdown mechanism 4; two clutch mechanisms 7 and 8; and a clutch control device. As shown in FIG. 1, the stepdown mechanism 4 comprises a drive member 5, e.g. formed by a wormscrew, engaged with a driven rotary member 6 that is constituted in the example shown by a gearwheel mounted free to rotate on and to move axially on the outlet shaft 2. The driven rotary member 6 or gearwheel is suitable for coupling/decoupling with the outlet shaft 2 by means of the two clutch mechanisms 7 and 8, each of which is mounted on the outlet shaft 2, one being on one side and the other on the other side of the gearwheel 6. One of the clutch mechanisms, referenced 7 in the figures, is a friction clutch with cones. This clutch comprises a male cone 7A constrained to rotate with the outlet shaft 2, and a "female" conical bearing surface 7B constrained to rotate with the rotary driven member of the stepdown mechanism 4, specifically the gearwheel 6. The male cone 7A and the conical bearing surface 7B are both arranged on the axis of the outlet shaft 2 and they are mounted via a clutch control device to move towards each other or away from each other. In the close-together position corresponding to the clutched position of the progressive clutch mechanism, the male cone 7A is housed at least in part inside the female conical bearing surface 7B, such that the rotary movement of the conical bearing surface 7B imparted to said bearing surface 7B by the gearwheel 6 is transmitted via the male cone 7A to the outlet shaft 2. This position of the cones can be seen in FIG. 4. The spaced-apart position of the male cone 7A and the female conical bearing surface 7B corresponds to the unclutched position of the progressive clutch mechanism and it is shown in FIG. 2.

In addition to the sleeve type movable dog 16, the non-progressive clutch mechanism 8 having a movable dog 16 comprises a hollow plate 17. The movable dog 16 and the plate 17 carry teeth 18 on their facing faces. The hollow plate 17 is constrained to rotate with the driven rotary member 6 of the stepdown mechanism 4 and thus with the gearwheel 6. In the example shown, the plate 17 and the gearwheel 6 form a rotary assembly that is constrained to rotate as a whole. The movable dog 16 is constrained to rotate with the outlet shaft 2 passing through the housing 3 and is movable axially along said shaft. The movable dog 16 is constrained to rotate with the outlet shaft 2 via at least one U-shaped strap 22. Each branch of the strap is inserted in a hole in the shaft 2. The middle portion of the U-shape constituting the strap is arranged parallel to the outlet shaft 2 and is received in an internal peripheral axial groove 21 of the sleeve constituting the movable dog 16 so that the movable dog 16 can move freely in sliding along the strap. In the examples shown, two diametrically opposite straps are used to constrain the movable dog in rotation with the outlet shaft 2, the movable dog 16 having two diametrically opposite grooves 21, each receiving one of the straps. The straps 22 guide said movable dog 16 in axial movement. The movable dog 16 also includes an outer annular groove 24 and two blind inner axial grooves 20 that perform a role that is described below. In the unclutched position of the non-progressive clutch mechanism, the movable dog 16 is close to the hollow plate 17 and the teeth 18 of the movable dog 16 are received between the teeth of the plate 17 so as to allow the hollow plate 17 to transmit rotary motion to the movable dog 16 and consequently to the outlet shaft 2.

In order to enable each clutch mechanism to go from an unclutched position to a clutched position, a clutch control device is provided. The clutch control device comprises first clutch control means 9 that are suitable for being actuated from outside the housing 3, and second clutch control means 10. The first clutch control means control the axial movement of the movable dog 16 of the non-progressive clutch means 8 along the outlet shaft 2. The first clutch control means 9 comprise a member 14, such as a fork, that is angularly movable about an axis that is substantially perpendicular to the axis of the outlet shaft 2. This fork comprises at least one portion, such as a tooth 15, that is inserted inside an outer annular groove 24 of the movable dog 16 of the non-progressive clutch mechanism 8.

In particular, as shown, the clutch control member 14 is movable angularly by using a control lever outside the housing. This clutch control member 14 is a fork having two branches. The web of the fork, interconnecting said branches, is extended axially on either side of said branches to form rod segments of square or rectangular section that become inserted in bearings formed in each half-shell of the housing. Each branch of the fork is provided with an inner radial tooth 15 for ensuring that the teeth of the fork are held captive inside the outer annular groove 24 of the axially movable dog of the non-progressive clutch mechanism. Thus, an angular movement of the fork about an axis orthogonal to the outlet shaft 2 allows the movable dog 16 to move axially along said outlet shaft 2 towards the hollow plate 17, or else to move away therefrom.

The second clutch control means 10 comprise at least one spring blade 11 mounted along the outlet shaft 2. This spring blade 11 is mounted to move axially along said shaft. During axial movement of the movable dog 16 from its unclutched extreme position in the clutching direction, as a result of the movable dog 16 pressing against said spring blade 11, the blade 11 is drivable axially along said shaft 2 and is deformable elastically between firstly an active position in which the movable dog 16 comes into abutment against said spring blade 11 so as to act via the spring blade 11 being interposed between the movable dog 16 and the progressive clutch mechanism 7 to transmit its axial movement to the progressive clutch mechanism 7 and pass the progressive clutch mechanism 7 to the clutched position, and secondly an inactive position in which the movable dog 16 slides along the spring blade 11 so as to pass the non-progressive clutch mechanism 8 from an unclutched position to a clutched position.

In the examples shown, the second clutch control means 10 comprise at least two spring blades 11 extending along the outlet shaft 2. These spring blades 11 are mounted diametrically opposite each other about said outlet shaft 2. In the vicinity of one of their ends, referenced 11B, they are coupled together so as to be constrained to move together axially along said outlet shaft 2 by means of a ring 12 engaged on said outlet shaft 2. The ring and the blades together form a one-piece unit that may be fabricated, e.g. by folding and stamping sheet metal. An equivalent solution would be to have a blade provided at one of its ends with a ring that is engaged on the outlet shaft 2.

The or each spring blade 11 of the clutch control means 10, in the active position, is/are arranged via a "free" end, referenced 11A in the figures, to press against an inner peripheral shoulder 19 of the movable dog 16. This inner peripheral shoulder 19 of the movable dog 16 may either be made integrally with said movable dog 16, or else by using an additional part 25 preferably made of metal, that is mounted to move both axially and in rotation with said movable dog 16. In the examples shown, it is the second option that is used. The part 25 that is fitted on one of the end faces of the sleeve constituting the movable dog body 16 is in the form of a centrally hollow metal washer. This washer is secured to the end face of the movable dog 16 opposite from its face facing the hollow plate 17. This is done by inserting the washer inside two diametrically opposite notches in the sleeve constituting the movable dog body 16. This fitted part 25 reduces the wear that is generated by friction against the spring blades 11. This free end 11A of the or each spring blade 11 is curved towards the outlet shaft so as to form a ramp that, by co-operating with the inner peripheral shoulder 19 of the movable dog 16, makes it easier to retract the corresponding spring blade 11 so as to pass to the inactive position.

The or each inner peripheral shoulder portion 19 of the movable dog 16, against which the or each spring blade 11 comes into abutment via its free end 11A, extends partially inside an inner axial groove 20 of said sleeve, with the or each spring blade 11 being mounted to rotate with the sleeve when it is in the inserted state in the grooves 20. The inner peripheral shoulder 19 of the movable dog 16 thus forms on each occasion one end of the axial groove 20 having its open other end opening out into an end face of the sleeve constituting the movable dog 16. The inner peripheral shoulder 19 of the dog 16 thus partially closes said axial groove 20. The or each groove 20 is also open towards the through passage formed by the sleeve constituting the movable dog 16.

Figure 5:
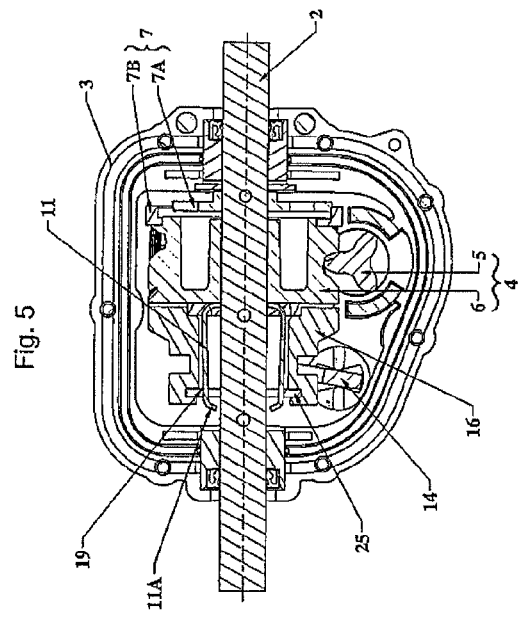
FIG. 5 is a section view of the transmission housing in the clutched position of the non-progressive clutch mechanism.
Figure 3:
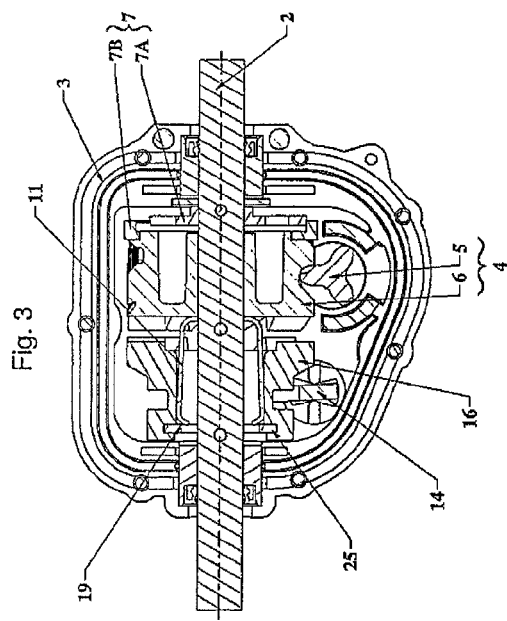
FIG. 3 is a section view of the housing of the transmission in the extreme declutched position of the two clutch mechanisms.
Figure 4:
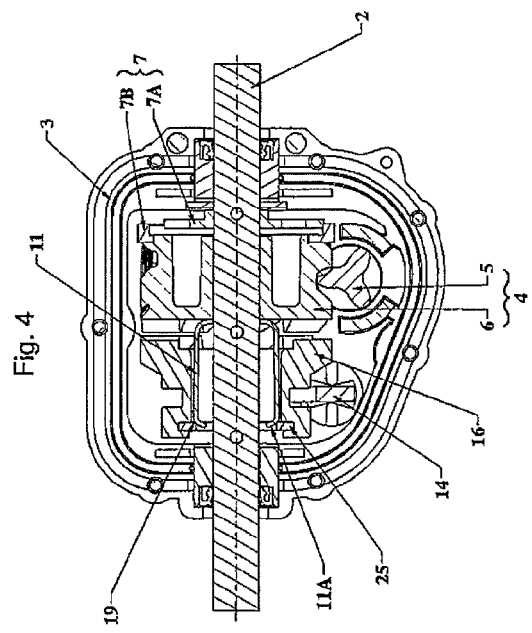
FIG. 4 is a section view of the housing of the transmission in the clutched position of the progressive clutch device.

The second control means 10 bear via the ring 12 against the hollow plate 17 of the non-progressive clutch mechanism. Thus, in the active position, the second clutch control means are sandwiched between the movable dog 16 and the hollow plate 17. When the movable dog 16 is moved axially by means of the first clutch control means away from the unclutched extreme position, as shown in FIG. 3, the movable dog 16 causes the second clutch control means to move axially along the outlet shaft 2, which second clutch control means bear against the hollow plate 17 that is constrained to move with the gearwheel 6 and with the female conical bearing surface 7B of the progressive clutch mechanism. The conical bearing surface 7B is then brought into the clutched position in abutment against the male cone 7A. The progressive clutch mechanism is clutched as shown in FIG. 4. Continued movement of the movable dog 16 causes the spring blades 11 to be deformed since they are subjected to a bearing force from the movable dog 16 that is greater than a predetermined value, given that these blades have their other ends in abutment via the ring against the hollow plate 17. This abutment results in the progressive clutch mechanism passing into the clutched position because the male cone of the progressive clutch mechanism is mounted to be axially stationary on the outlet shaft 2. Continued movement of the movable dog 16 thus deforms the blades. During this deformation, the blades tend to escape from the shoulder zone of the axial groove of the sleeve and to approach the outlet shaft 2. In this inactive position of the blades, the movable dog 16 is free to slide along the blades, as shown in FIG. 4, until reaching the clutched position of the non-progressive clutch mechanism. In the position where they have escaped from the shouldered zone of the sleeve, the spring blades 11 become inserted into the space left empty between the inner periphery of the sleeve constituting the movable dog 16 and the outlet shaft 2, as shown in FIG. 5. The movable dog 16 is made so as to be engaged with clearance on the outlet shaft. It is this clearance that constitutes the empty space in which the spring blades 11 can be received when they escape from the shoulder 19 after being deformed under the action of the movable dog 16.

Passage to the unclutched position is performed by moving the first clutch control means in an opposite direction, thereby giving rise to a reversal, i.e. to the movable dog 16 moving away from the hollow plate 17. During this axial movement, over a fraction of the stroke of the movable dog 16, the moving second control means are held against axial movement by one of the branches of the strap 22 forming an axial abutment of the second drive means. This branch of the strap is housed between the ring 12 of the second drive control means and the movable dog 16. This axial abutment enables the spring blades 11 of the second drive control means to be repositioned to bear via their free ends 11A against the inner peripheral shoulder of the sleeve constituting the movable dog beyond a predetermined reversal position of said sleeve. The transmission is then ready for a new clutching stage.

In the above, it should be observed that, on passing from the active position to the inactive position, the spring blades 11 of the second clutch control means deform on approaching the outlet shaft 2. In equivalent manner, they could be arranged to deform on going away from said outlet shaft 2.

From the above, it can be understood that the second clutch control means are mounted to move axially along the outlet shaft 2 between a position bearing centrally against the hollow plate 17 and a position bearing against one of the branches of the strap 22, said branch being referenced 23 in the figures. The axial abutment constituting the branch 23 of the strap is active during unclutching stages, whereas the bearing position of the second clutch control means against the hollow plate 17 is active during the clutching stage.

The invention claimed is:

1. A transmission between a primary drive shaft (1) and an outlet shaft (2), the transmission comprising:
    at least one housing (3) within which there are housed at least in part:
        a stepdown mechanism (4) comprising a driving member (5) meshing with a driven rotary member (6);
        two clutch mechanisms (7, 8), one of the mechanisms (7) being progressive and the other mechanism (8) being non-progressive with a movable dog (16), whereby the driven rotary member (6) is suitable for being coupled/decoupled with or from the outlet shaft (2); and
        a clutch control device comprising
            first clutch control means (9) for driving the movable dog (16) of the non-progressive clutch mechanism (8) in axial movement along the outlet shaft (2) between two extreme positions, said first clutch control means (9) being capable of being actuated from outside the housing (3), and
            second clutch control means (10) mounted on the outlet shaft (2) to move under the action of the movable dog (16) moving axially in the clutching direction, by bearing contact against said movable dog (16), between i) an active position in which said second clutch control means (10) are interposed between the movable dog (16) and the progressive clutch mechanism (7) and form a member for transmitting axial movement from the movable dog (16) to the progressive clutch mechanism (7) in order to pass the progressive clutch mechanism from a declutched position to a clutched position, and ii) an inactive or retracted position in which the movable dog (16) is suitable for passing from an unclutched position to the clutched position of the non-progressive clutch mechanism (8);
    wherein the second clutch control means (10) comprise at least two spring blades (11) extending along the outlet shaft (2) and mounted diametrically opposite each other about said outlet shaft (2), said spring blades being coupled together, at or close to respective ends (11A, 11B) of said spring blades (11), by means of a ring (12) that is engaged on said outlet shaft (2) so as to be constrained to move together axially along said outlet shaft (2), said spring blades (11) being mounted to move axially on said outlet shaft (2) and having said movable dog (16) bearing thereagainst during the axial movement of the movable dog (16) from the unclutched extreme position towards a clutched position, thereby driving said spring blades (11) axially on said shaft (2) and deforming said spring blades elastically between an active position in which the movable dog (16) comes into abutment against said spring blades (11) to transmit its axial movement to the progressive clutch mechanism (7) via the spring blades (11) interposed between the movable dog (16) and the progressive clutch mechanism, and an inactive position in which the movable dog (16) slides along the spring blades (11) to pass the non-progressive clutch mechanism (8) from an unclutched position to a clutched position.

2. The transmission according to claim 1, wherein the ring and the spring blades together form a one-piece unit fabricated by folding and stamping sheet metal.

3. The transmission according to claim 1, wherein the movable dog (16) has a peripheral shoulder, against which each spring blade comes into abutment via a respective free end of each spring blade, each of said free ends being curved towards the outlet shaft so as to form a ramp.

4. The transmission according to claim 2, wherein the movable dog (16) has a peripheral shoulder, against which each spring blade comes into abutment via a respective free end of each spring blade, each of said free ends being curved towards the outlet shaft so as to form a ramp.

5. The transmission according to claim 1, wherein free ends of the spring blades come into abutment against the movable dog (16), said free ends each being curved towards the outlet shaft so as to form a ramp,
    said free ends being ends of the spring blades opposite to the respective ends (11A, 11B) of the spring blades that are coupled together by means of the ring (12).

6. The transmission according to claim 2, wherein free ends of the spring blades come into abutment against the movable dog (16), said free ends each being curved towards the outlet shaft so as to form a ramp,
    said free ends being ends of the spring blades opposite to the respective ends (11A, 11B) of the spring blades that are coupled together by means of the ring (12).

* * * * *